United States Patent [19]

Ogawa

[11] Patent Number: 5,324,069
[45] Date of Patent: Jun. 28, 1994

[54] SUSPENSION CONTROL SYSTEM WITH VARIABLE DAMPING COEFFICIENTS DEPENDENT ON EXCITING FORCE FREQUENCY

[75] Inventor: Kazuo Ogawa, Toyota, Japan

[73] Assignee: Toyota Jidosha Kabushiki Kaisha, Toyota, Japan

[21] Appl. No.: 47,203

[22] Filed: Apr. 16, 1993

[30] Foreign Application Priority Data

Apr. 17, 1992 [JP] Japan ................................. 4-124213
Apr. 17, 1992 [JP] Japan ................................. 4-124214

[51] Int. Cl.⁵ .......................................... B60G 17/08
[52] U.S. Cl. ............................. 280/707; 364/424.05; 188/299
[58] Field of Search ................. 280/707; 364/424.05; 188/299

[56] References Cited

U.S. PATENT DOCUMENTS

| | | | |
|---|---|---|---|
| 4,916,632 | 4/1990 | Doi et al. | 280/707 X |
| 5,020,781 | 6/1991 | Huang | 280/707 |
| 5,060,157 | 10/1991 | Tado et al. | 280/707 |
| 5,101,355 | 3/1992 | Wada et al. | 280/707 |
| 5,172,929 | 12/1992 | Butsuen et al. | 280/707 |
| 5,189,615 | 2/1993 | Rubel et al. | 364/424.05 |
| 5,193,844 | 3/1993 | Butsuen et al. | 280/707 |
| 5,199,737 | 4/1993 | Huang | 280/707 |

FOREIGN PATENT DOCUMENTS

| | | |
|---|---|---|
| 0403803 | 12/1990 | European Pat. Off. |
| 4011976 | 10/1990 | Fed. Rep. of Germany |
| 4017256 | 12/1990 | Fed. Rep. of Germany |
| 61-163011 | 7/1986 | Japan |
| 3276806 | 12/1991 | Japan |
| 3276807 | 12/1991 | Japan |
| 3276808 | 12/1991 | Japan |
| 3276811 | 12/1991 | Japan |
| 4015113 | 1/1992 | Japan |

OTHER PUBLICATIONS

Experimental Comparison of Passive, Semi-Active on/Off, and Semi-Active Continuous Suspensions, D. E. Ivers et al, pp. 1–7.
The Experimental Performance of an "on–off active damper", The Shock and Vibration (1980) vol. 51 No. 1 pp. 125–131.
Analysis of Semi-active Suspensions by Nonlinear Freedback Control, Toshikazu S. et al, pp. 1021–1023.
Japanese Automobile Engineers Association publication, Theoretical Study on Stability of Semi-active Suspension Toshikazu Shioneri et al. pp. 90–94.
Japanese Automobile Engineers Association Publication Oct. 1984 "Semi-active Control and Preview Control of Suspension" pp. 301–306.

Primary Examiner—Margaret A. Focarino
Assistant Examiner—Peter English
Attorney, Agent, or Firm—Cushman, Darby & Cushman

[57] ABSTRACT

A suspension control system for a suspension supporting a mass body on a support base via a parallel combination of a shock absorber having a variable damping coefficient and a spring. The control system cyclically measures absolute velocity ($\dot{Z}$) of the mass body along a moving path of expansion and contraction of the shock absorber, relative velocity ($\dot{Y}$) of the mass body in reference to the support base along the moving path, and acceleration ($\ddot{Z}$) of the mass body along the moving path. A control unit of the control system controls the damping coefficient according to a ratio ($\dot{Z}/\dot{Y}$) of the absolute velocity to the relative velocity with cyclic readjustment thereof so that at least either the damping coefficient is greater relative to the ratio when the acceleration is rich in low frequency components or a frequency of the cyclic readjustment of the damping coefficient is lower when the acceleration is rich in high frequency components.

9 Claims, 10 Drawing Sheets

SUSPENSION CONTROL SYSTEM WITH VARIABLE DAMPING COEFFICIENTS DEPENDENT ON EXCITING FORCE FREQUENCY

BACKGROUND OF THE INVENTION

1. Field of the Invention

The present invention relates to a suspension for supporting a mass body on a support base via a parallel combination of a spring means and a shock absorber, and more particularly to a control of such a suspension with certain variations of the damping coefficient of the shock absorber.

2. Description of the Prior Art

A suspension for supporting a mass body on a support base via a parallel combination of a spring means and a shock absorber is common in the art of automobiles, wherein a mass body comprised of a vehicle body and a passenger or passengers is supported on a plurality of vehicle wheels via a plurality of suspension mechanisms each including a parallel combination of a suspension spring and a shock absorber, so that each parallel combination of the spring and the shock absorber bears a share of the total mass of the vehicle body and the passenger or passengers to support it on a corresponding vehicle wheel.

Figure 13:
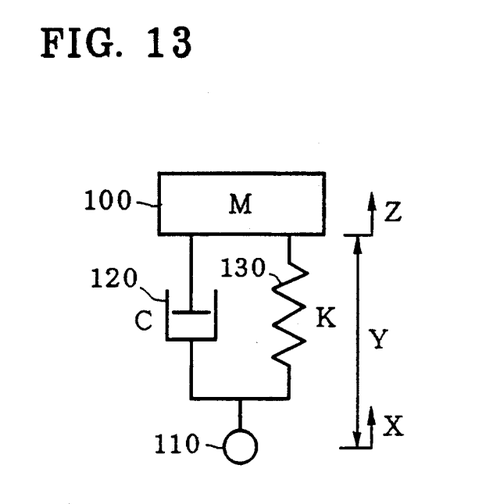
FIG. 13 is a schematic illustration of a common prior art suspension of a vehicle.

FIG. 13 illustrates schematically such a dynamic system, wherein a mass body 100 having a mass M is supported on a support base 110 via a suspension comprising a parallel combination of a spring 130 having a spring coefficient K and a shock absorber 120 having a damping coefficient C. As is well known in the art, expressing the absolute displacements of the support base 110 and the mass body 100 in reference to a certain absolute ordinate by X and Z, respectively, thereby also expressing the relative displacement of the mass body 100 in reference to the support base 110 by Y, the dynamic motion of the dynamic system is expressed as follows:

$$M\ddot{Z} = -C(\dot{Z} - \dot{X}) - K(Z - X) \qquad (1)$$
$$= -C\dot{Y} - KY$$

Figure 14:
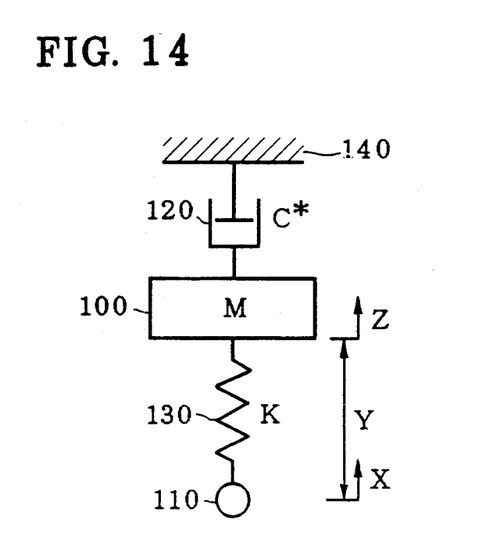
FIG. 14 is a schematic illustration of a prior art suspension incorporating a sky hook damper.

In the suspension shown in FIG. 13, the spring 130 is indispensable for supporting the mass body 100 against the gravity in the dynamic state as well as in the static state of the system, whereas the shock absorber 120 operates only to dampen a dynamic movement of the mass body 110 and is ineffective in the static state of the system. In view of this, it is considered to mount the shock absorber 120 between the mass body 100 and a stationary member 140 as shown in FIG. 14, in order to more effectively dampen the dynamic movement of the mass body 100 when desired, although no such stationary member is available in the case of the suspension of automobile. A damper such as the shock absorber 120 in FIG. 14 provided above the mass body 100 to dampen the movement of the mass body 100 from the overhead stationary member 140 is called a sky hook damper. It has been proposed in Japanese Patent Laid-open Publications 3-276806, 3-276807, 3-276808, 3-276811 and 4-15113 assigned to the same assignee as the present application to analyze the system shown in FIG. 14 in the equivalency conversion to the system shown in FIG. 13, so that the damping action of the shock absorber 120 in the system shown in FIG. 13 is approximated to the shock absorber 120 in the system shown in FIG. 14, so as thereby to obtain a more stable damping effect for the mass body 100 without the stationary member in the case of the automobile suspension.

In more detail, according to the conventional dynamics, the dynamic motion of the system shown in FIG. 14 is expressed by $$M\ddot{Z} = -C^*\dot{Z} - K(Z - X) \qquad (2)$$
$$= -C^*\dot{Z} - KY$$

wherein $C^*$ and K are the damping coefficient and the spring coefficient of the shock absorber 120 and the spring 130 in FIG. 14, respectively. Therefore, from the comparison of equations (1) and (2), if the damping coefficient C of the system shown in FIG. 13 is controlled to be a product of a constant damping coefficient $C^*$ in FIG. 14 and a ratio $\dot{Z}/\dot{Y}$, i.e. the ratio of the absolute velocity of the mass body 100 to the relative velocity of the mass body 100 in reference to the support base 110, the mass body 100 in the system shown in FIG. 13 will be more stably suspended on the support base 110 as if the dynamic movement of the mass body 100 were dampened by the shock absorber 120 supported by the stationary member 140 in FIG. 14.

According to the above-mentioned sky hook damper theory, the damping coefficient of the shock absorber is controlled to make the product $C^*.\dot{Z}/\dot{Y}$ to be equivalent to the damping coefficient C of the conventional shock absorber.

However, when the damping coefficient of the shock absorber is variably controlled, the shock absorber will be able to operate more effectively not only so as to dampen the oscillation of a mass body such as a vehicle body according to the above-mentioned sky hook damper theory but also so as more properly to meet with the irregularity conditions of the road surface which require a soft damper, i.e. a relatively low damping coefficient at times but require a hard damper, i.e. a relatively high damping coefficient at other times.

SUMMARY OF THE INVENTION

Therefore, it is a first object of the present invention to provide a suspension control system for a suspension, wherein the damping coefficient is variably controlled not only so as to accomplish the sky hook damper theory but also for more desirably adapting the shock absorber to the irregularity conditions of the road surface.

In this connection, when the damping coefficient is variably controlled, if the control operation is carried out too often while a vehicle is running on a road surface having relatively short-pitched up and down irregularities, such too often changes of the damping coefficient will damage the riding comfortability of the vehicle, whereas if the control operation is carried out too seldom while the vehicle is running on a road surface having relatively long-pitched up and down irregularities, oscillations of the vehicle body, particularly the pitching and the heaving, will not be effectively suppressed.

Therefore, in view of these, it is a second object of the present invention to provide a suspension control system for a suspension, wherein the frequency of control of the damping coefficient is variably controlled to meet with the irregularity conditions of the road surface.

According to the present invention, the above-mentioned first or second object is accomplished by a suspension control system for a suspension for supporting a mass body on a support base via a parallel combination of a shock absorber having a variable damping coefficient and a spring means, comprising:

a means for obtaining absolute velocity ($\dot{Z}$) of said mass body along a moving path of expansion and contraction of said shock absorber;

a means for obtaining relative velocity ($\dot{Y}$) of said mass body in reference to said support base along said moving path;

a means for obtaining acceleration of said mass body along said moving path; and a means for controlling a damping coefficient of said shock absorber according to a ratio ($\dot{Z}/\dot{Y}$) of said absolute velocity to said relative velocity with cyclic readjustment thereof so that at least either said damping coefficient is greater relative to said ratio when said acceleration is rich in low frequency components or a frequency of said cyclic readjustment is lower when said acceleration is rich in high frequency components.

The damping coefficient may be controlled to be greater relative to said ratio when said acceleration is not rich in high frequency components.

The damping coefficient may be controlled to be between a damping coefficient for said acceleration being rich in low frequency components and not rich in high frequency components and a damping coefficient for said acceleration being not rich in low frequency components and rich in high frequency components when said acceleration is rich in both low and high frequency components.

The damping coefficient may be controlled to be between a damping coefficient for said acceleration being rich in low frequency components and not rich in high frequency components and a damping coefficient for said acceleration being not rich in low frequency components and rich in high frequency components when said acceleration is not rich in both low and high frequency components.

The frequency of said cyclic readjustment of the damping coefficient may be controlled to be even lower when said acceleration is not rich in low frequency components.

The frequency of said cyclic readjustment of the damping coefficient may be controlled to be between a frequency for said acceleration being rich in high frequency components and not rich in low frequency components and a frequency for said acceleration being not rich in high frequency components and rich in low frequency components when said acceleration is rich in both high and low frequency components.

The frequency of said cyclic readjustment of the damping coefficient may be controlled to be between a frequency for said acceleration being rich in high frequency components and not rich in low frequency components and a frequency for said acceleration being not rich in high frequency components and rich in low frequency components when said acceleration is not rich in both low and high frequency components.

It may be determined that said acceleration is rich in low frequency components when a signal bearing said acceleration is filtered through a low pass filter and a magnitude of the filtered signal is equal to or greater than a predetermined value at or more than a predetermined number of times of a predetermined number of successive cycle time points.

It may be determined that said acceleration is more rich in high frequency components when a signal bearing said acceleration is filtered through a high pass filter and a magnitude of the filtered signal is equal to or greater than a predetermined value at or more than a predetermined number of times of a predetermined number of successive cycle time points

BRIEF DESCRIPTION OF THE DRAWINGS

In the accompanying drawings.

Description of the Preferred Embodiment

In the following the present invention will be described in more detail with respect to an embodiment with reference to the accompanying drawing.

Figure 1:
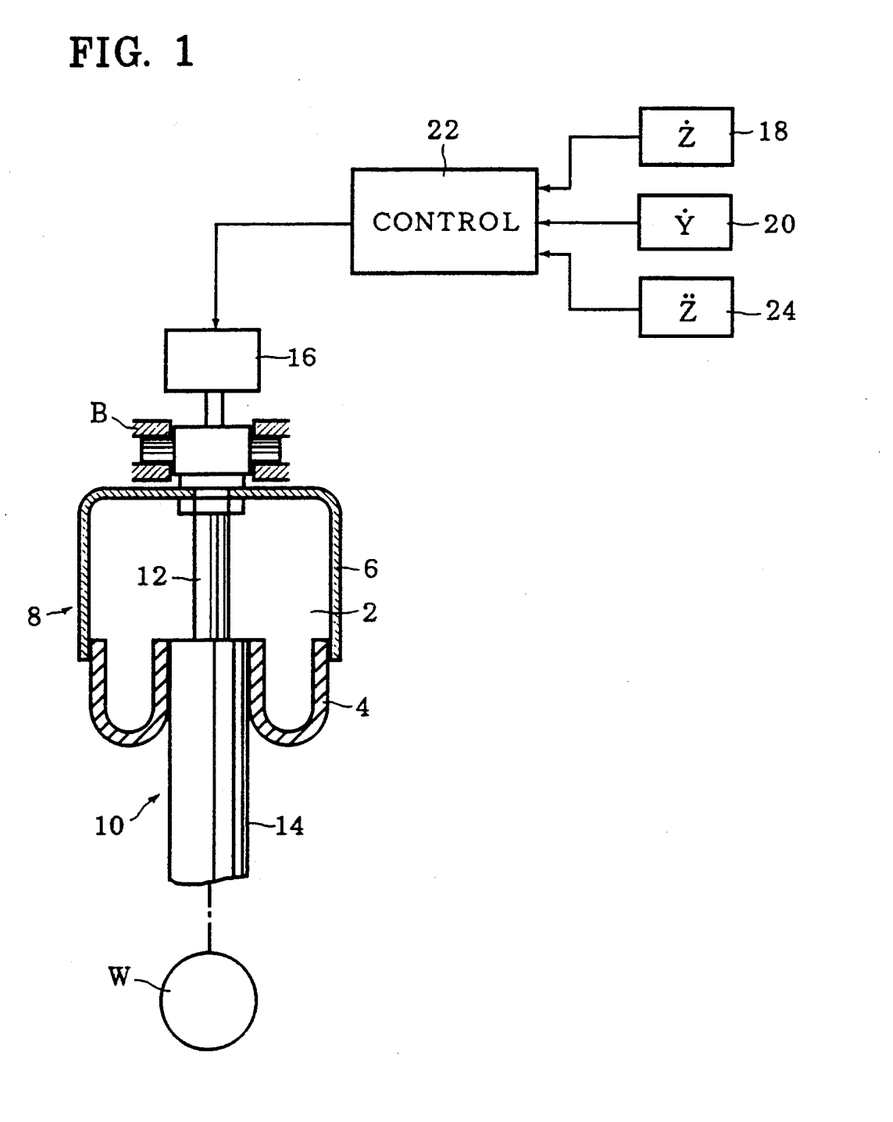
FIG. 1 is a partially diagrammatical illustration of an embodiment of the suspension control system according to the present invention.

Referring to FIG. 1 showing a suspension of a vehicle incorporating an embodiment of the suspension control system according to the present invention, the suspension comprises a shock absorber 10 having a piston member 12 and a cylinder member 14 and an air spring 8 including a cup member 6 and a diaphragm member 4 providing an air spring chamber 2. The upper end of the piston member 12 and the cup member 6 are pivotably mounted to a part of a vehicle body designated by B, whereas a movable end of the diaphragm member 4 is mounted to the upper end of the cylinder member 14 which is connected to a vehicle wheel W at the lower end thereof, so that the shock absorber 10 and the air spring 8 are mounted in parallel between the vehicle body and the vehicle wheel.

According to the present invention, the damping coefficient of the shock absorber 10 is controlled by an actuator 16 to be substantially proportional to a product of a basic damping coefficient C* and a ratio $\dot{Z}/\dot{Y}$ under the control of a control means 22 based upon such parameter signals as absolute vertical velocity $\dot{Z}$ of the vehicle body at a portion thereof corresponding to the shock absorber 10 (the same hereinunder) received from a means 18, relative velocity $\dot{Y}$ of the vehicle body in reference to the vehicle wheel received from a means 20 and vertical exciting force F, or acceleration $\ddot{Z}$ of the vehicle body, received from a means 24, as described in detail hereinbelow. In this connection, shock absorbers or dampers having a variable damping coefficient are known in various constructions. The above-mentioned Japanese publications also show a detailed construction of such a variable damper. Therefore, further detailed descriptions of the construction of the shock absorber 10 will be omitted, except that the damping coefficient of the shock absorber 10 is controlled to vary by the actuator 16.

Figure 2:
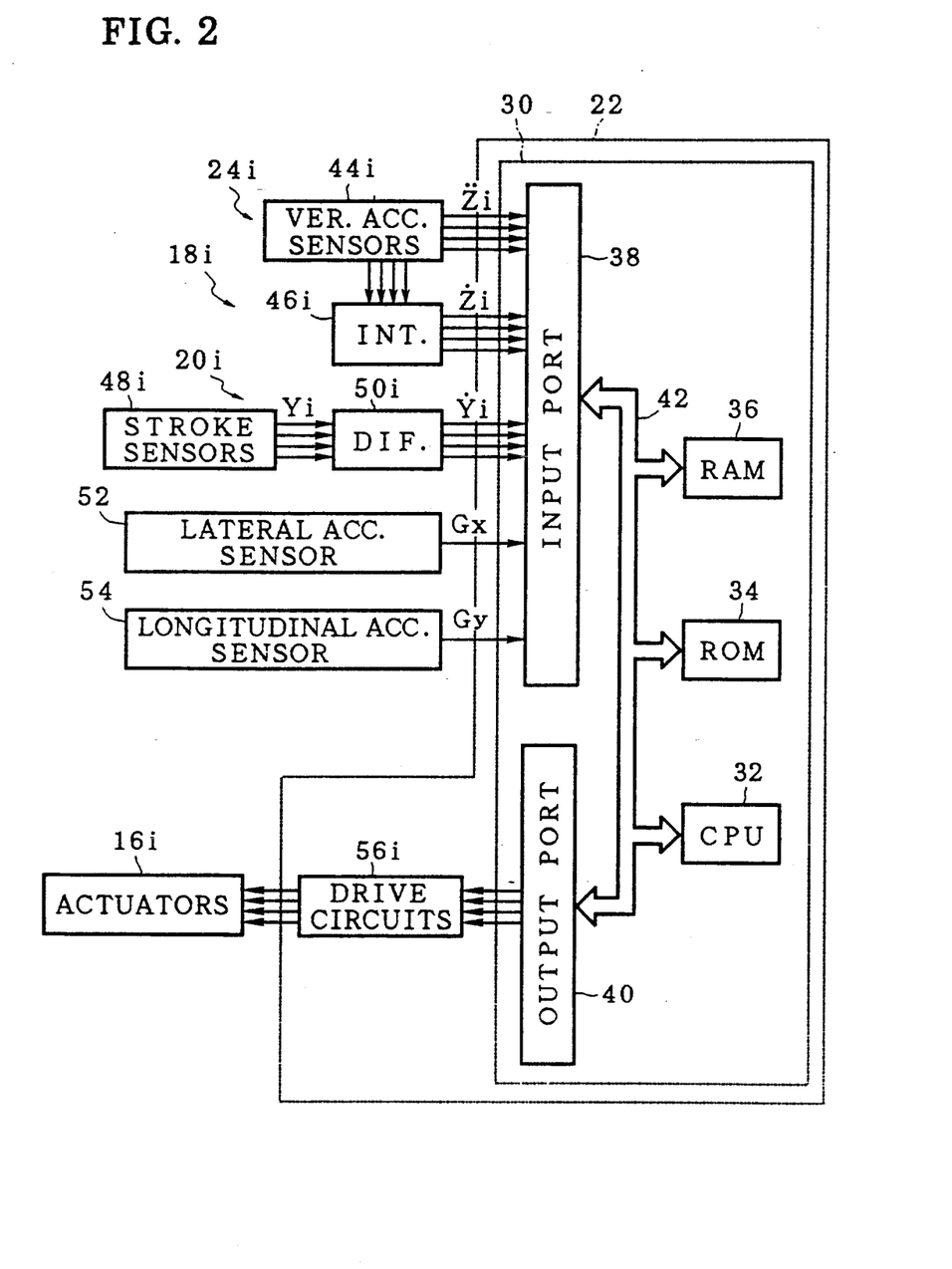
FIG. 2 is a block diaphragm showing an embodiment of the signal processing system incorporated in the suspension control system according to the present invention.

FIG. 2 shows in the form of a system diagram an embodiment of a combination of the control means 22 and the means 18-24 for obtaining the respective control signals. In FIG. 2, the portions corresponding to those shown in FIG. 1 are designated by the same reference numerals with, however, suffix "i", expressing that those means are provided for each suspension at each vehicle wheel of a vehicle. The control means 22 comprises a micro processor 30 which may be of a common type well known in the art, including a central processing unit (CPU) 32, a read only memory (ROM) 34, a random access memory (RAM) 36, an input port means 36, an output port means 40 and a bi-directional common bus 42.

Reference numeral 44, more precisely reference numeral 44i, wherein i may be 1, 2, 3 and 4 in the case of a four wheel vehicle, designates a vertical acceleration sensor which detects the acceleration acting on the vehicle body, more precisely a part of the vehicle body representing a share of mass to be suspended by each suspension. The vertical acceleration sensor 44 corresponds to the means 24 in FIG. 1. Of course, the vertical acceleration of the vehicle body corresponds to the vertical exciting force applied to the vehicle body. The vertical acceleration detected by the vertical acceleration sensor 44 is integrated on a time base in an integrator 46, more precisely 46i, to generate absolute velocity $\dot{Z}$, more precisely $\dot{Z}i$, of the corresponding part of the vehicle body. Therefore, the combination of the vertical acceleration sensor 44 and the integrator 46 corresponds to the means 18 in FIG. 1 for detecting the absolute velocity $\dot{Z}$ of the vehicle body. The acceleration $\ddot{Z}$ and the absolute velocity $\dot{Z}$ are both supplied to the micro computer 30 through the input port means 38.

Reference numeral 48, more precisely reference numeral 48i, is a stroke sensor which detects the relative displacement of the vehicle body at a portion thereof corresponding to each suspension in reference to the corresponding vehicle wheel. This relative displacement is the same as the stroking displacement of the shock absorber 10. Although not shown in the mechanical construction, the stroke sensor 48 may be of any conventional type which detects the relative displacement between the piston member 12 and the cylinder member 14 of the shock absorber 10. The relative displacement Y, more precisely Yi, detected by the stroke sensor 48 is differentiated in a differentiator 50, more precisely 50i, on a time base to generate relative velocity $\dot{Y}$, more precisely $\dot{Y}i$, of the vehicle body at the part thereof corresponding to each suspension in reference to the corresponding vehicle wheel. The relative velocity $\dot{Y}$ thus obtained is supplied to the micro computer 30 through the input port means 38. Therefore, the combination of the stroke sensor 48 and the differentiator 50 corresponds to the means 20 in FIG. 1 for obtaining the relative velocity $\dot{Y}$ in reference to the vehicle wheel.

The micro computer 30 is further supplied with a signal with respect to lateral acceleration Gx of the vehicle body from a lateral acceleration sensor 52, and a signal with respect to longitudinal acceleration Gy of the vehicle body from a longitudinal acceleration sensor 54.

The micro computer 30 carries out certain calculations by CPU 32 and RAM 36 according to certain programs stored in ROM 34 based upon the signals representing $\dot{Z}$, $\dot{Y}$, F or $\ddot{Z}$, Gx and Gy to generate control signals for operating the actuator 16, more precisely 16i, through a drive circuit 56, more precisely 56i.

Figure 3:
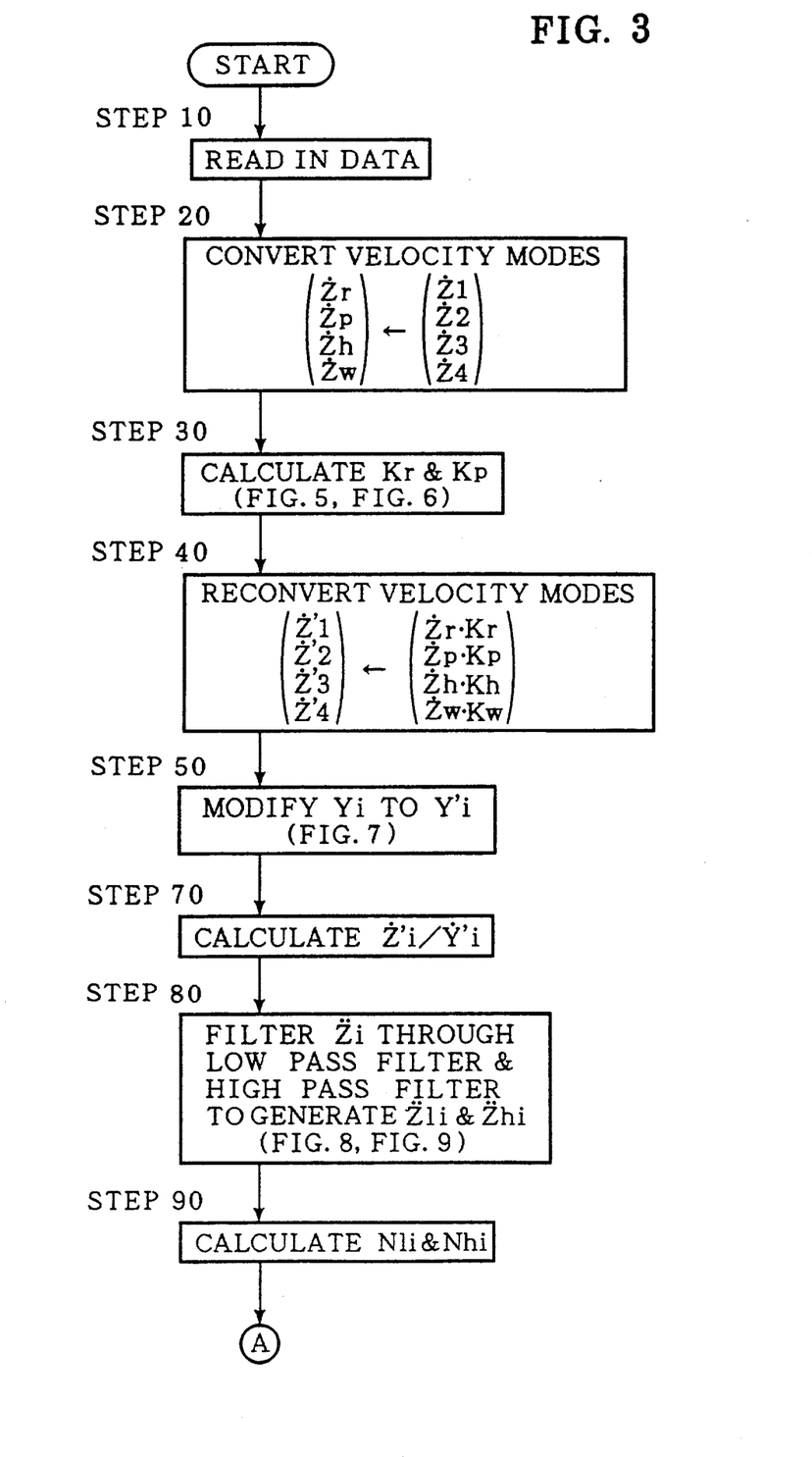
FIGS. 3 and 4 are upstream and downstream halves of a flowchart showing an embodiment of the control operation carried out by the suspension control system according to the present invention.
Figure 4:
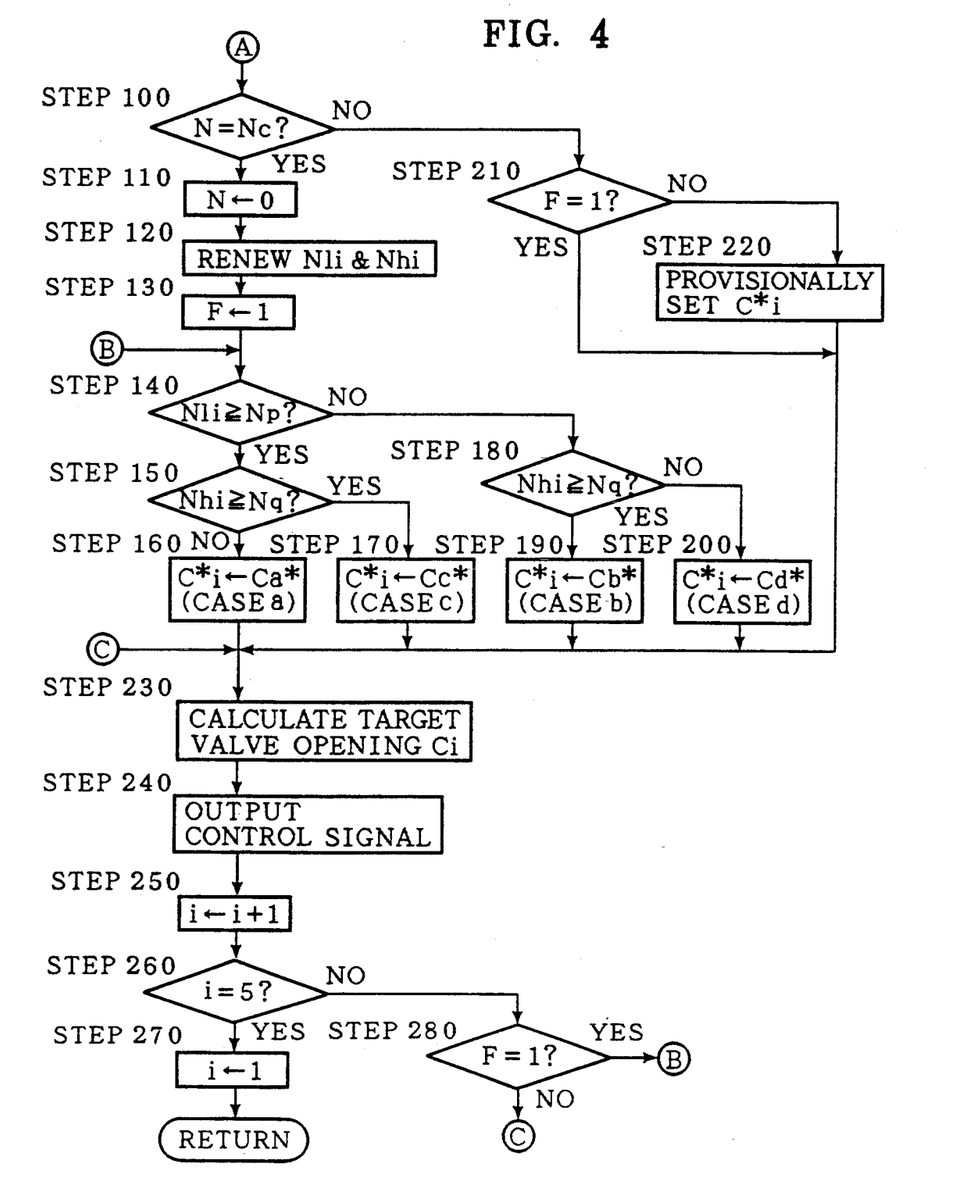
Figure 7:
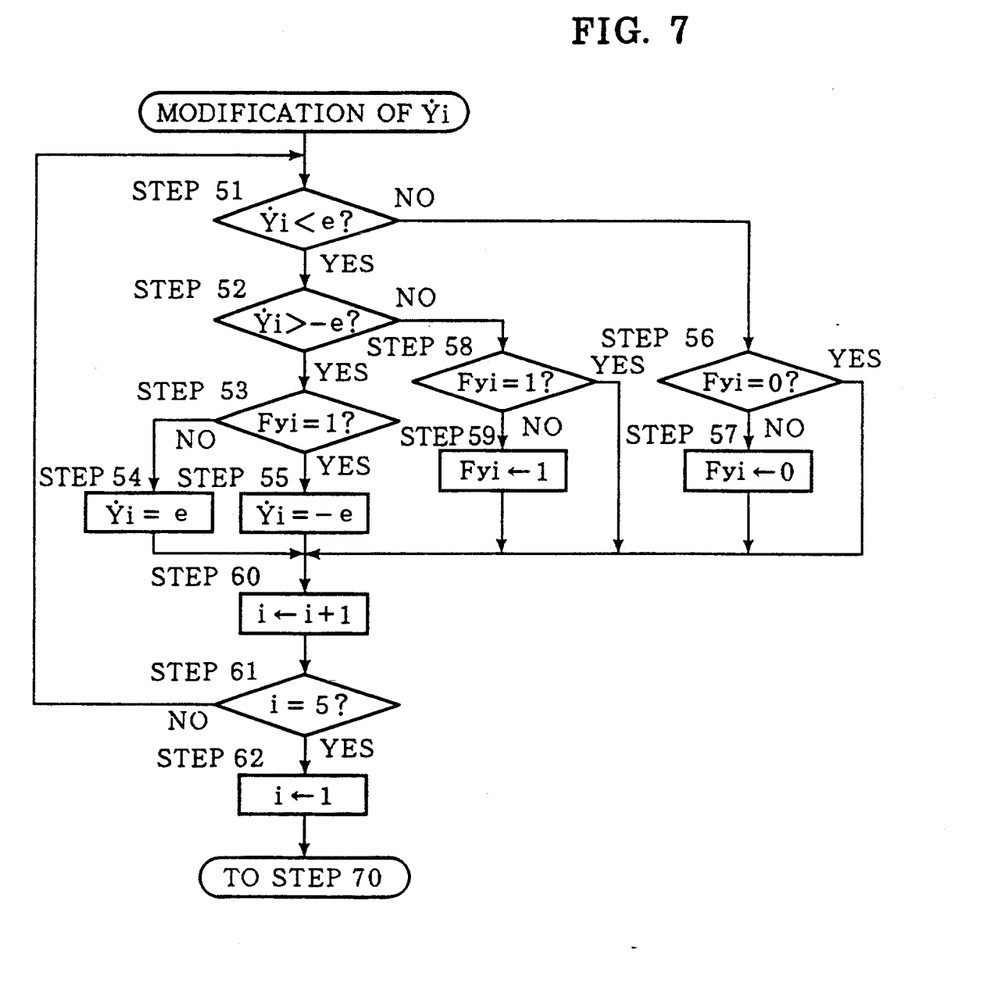
FIG. 7 is a flowchart showing an embodiment of the control process for a modification of the relative velocity of the mass body carried out in step 50 of FIG. 3.

Such a control operation of the micro computer 30 according to the first embodiment of the present invention is shown in the form of flowcharts in FIGS. 3, 4 and 7. The control operation is started upon the closing of the ignition switch and cyclically repeated until it is terminated after the lapse of a certain short time when the ignition switch was opened.

When the control operation is started, in step 10, after all data remaining in RAM 36, etc. have been initialized, data with regard to $\dot{Z}i$, $\ddot{Z}i$, $\dot{Y}i$, Gx and Gy are obtained and read in according to the manner described with reference to FIG. 2. Then the control process proceeds to step 20.

In step 20, a mode change of absolute velocity is carried out to obtain the velocities in the roll, pitch, heave and warp from the vertical absolute velocities at four vehicle wheels according to the following equations:

$$\dot{Z}r = \dot{Z}1 - \dot{Z}2 + \dot{Z}3 - \dot{Z}4$$

$$\dot{Z}p = \dot{Z}1 + \dot{Z}2 - \dot{Z}3 - \dot{Z}4$$

$$\dot{Z}h = \dot{Z}1 + \dot{Z}2 + \dot{Z}3 + \dot{Z}4$$

$$\dot{Z}w = \dot{Z}1 - \dot{Z}2 - \dot{Z}3 + \dot{Z}4.$$

Figure 5:
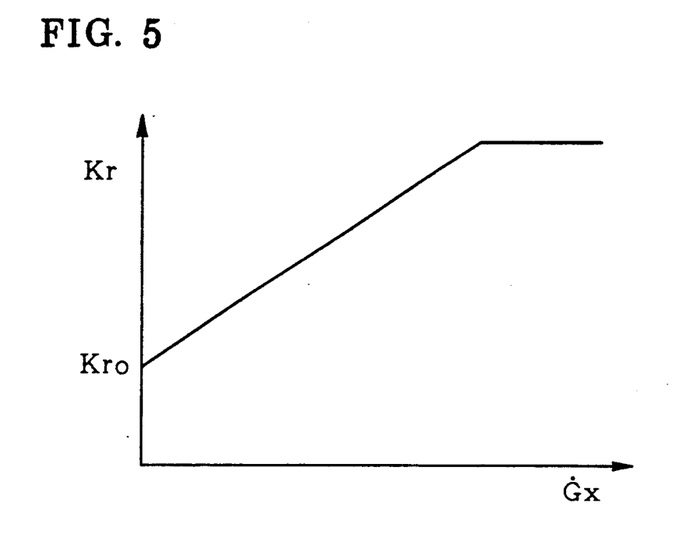
FIG. 5 is a graph showing an example of a roll gain performance.
Figure 6:
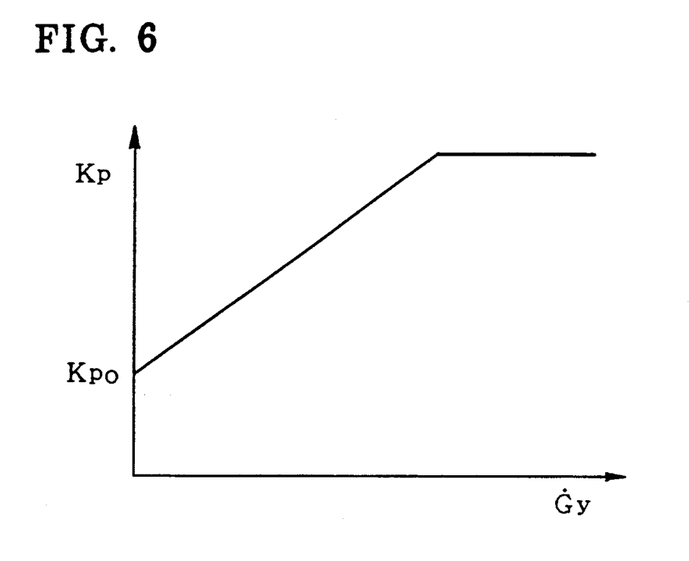
FIG. 6 is a graph showing an example of a pitch gain performance.

Then, in step 30, the lateral acceleration Gx and the longitudinal acceleration Gy are differentiated on time base, and according to the change rate $\dot{G}x$ and $\dot{G}y$, a gain factor Kr for the rolling and a gain factor Kp for the pitching are obtained according to maps such as shown in FIGS. 5 and 6, respectively. In these maps, the minimum values Kro and Kpo may be equal to or greater than 1. Alternatively, the gain factors Kr and Kp may be changed according to the lateral acceleration Gx, or steering rate, and the longitudinal acceleration Gy, respectively.

Then, in step 40, the absolute velocities of the vehicle body at the respective vehicle wheels are reconstructed from the roll, pitch, heave and warp velocities with a modification of reflecting the magnitudes of the lateral and longitudinal accelerations thereon according to the following equations:

$$\dot{Z}'1 = \dot{Z}r \cdot Kr + \dot{Z}p \cdot Kp + \dot{Z}h \cdot Kh + \dot{Z}w \cdot Kw$$

$$\dot{Z}'2 = -\dot{Z}r \cdot Kr + \dot{Z}p \cdot Kp + \dot{Z}h \cdot Kh - \dot{Z}w \cdot Kw$$

$$\dot{Z}'3 = \dot{Z}r \cdot Kr - \dot{Z}p \cdot Kp + \dot{Z}h \cdot Kh - \dot{Z}w \cdot Kw$$

$$\dot{Z}'4 = -\dot{Z}r \cdot Kr - \dot{Z}p \cdot Kp + \dot{Z}h \cdot Kh + \dot{Z}w \cdot Kw.$$

Kh and Kw are gain factors for the heaving and the warping, respectively, and may be of a value of 1, respectively.

In step 50, $\dot{Y}i$ are modified to $\dot{Y}'i$ according to a subroutine described in detail with reference to FIG. 7, in order to avoid that a division by zero occurs in the calculation of the ratio of $\dot{Z}'i/\dot{Y}'i$.

In step 70, ratio $\dot{Z}'i/\dot{Y}'i$ is calculated.

Figure 8:
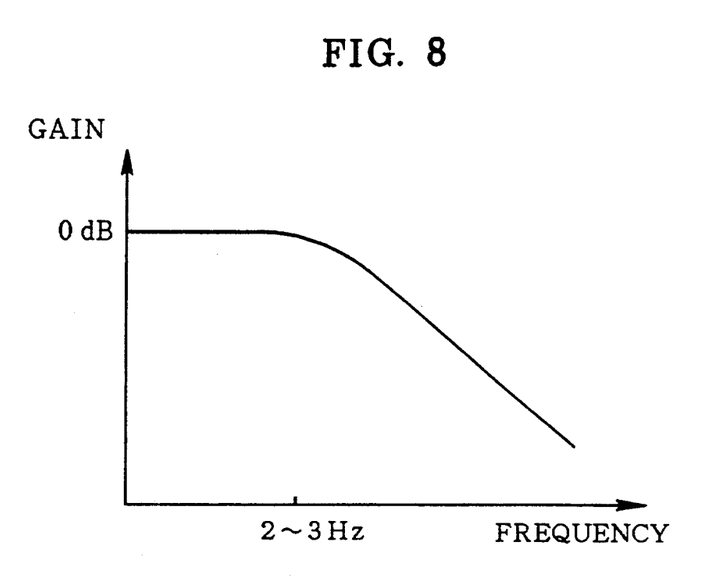
FIG. 8 is a graph showing an example of low pass filter performance.
Figure 9:
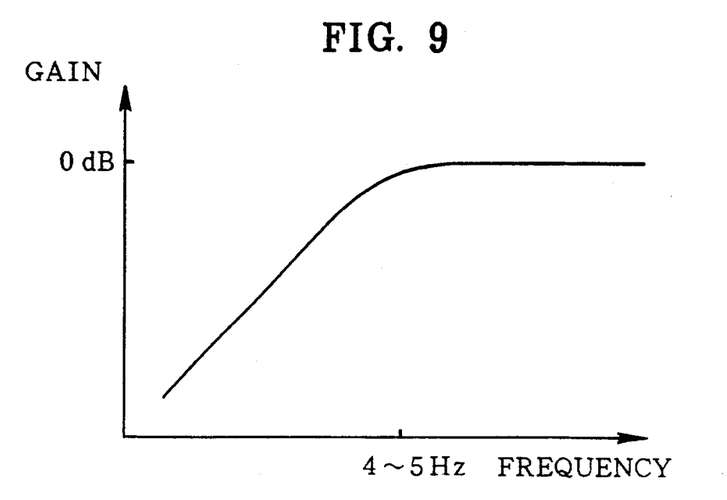
FIG. 9 is a graph showing an example of high pass filter performance.

In step 80, the vertical acceleration of the vehicle body $\ddot{Z}i$ read in in step 10 is processed by a low pass filter and a high pass filter having such filtering characteristics as shown in FIGS. 8 and 9, respectively. The low pass filter presents a steeply decreasing pass ratio for signals bearing frequencies higher than 2–3 Hz as shown in FIG. 8. Therefore, low frequency accelerations $\ddot{Z}li$ representing low frequency components of $\ddot{Z}i$ are extracted through the low pass filter. On the other hand, the high pass filter presents a steeply decreasing pass ratio for signals bearing frequencies lower than 4–5 Hz as shown in FIG. 9. Therefore, high frequency accelerations $\ddot{Z}hi$ representing high frequency components of $\ddot{Z}i$ are extracted through the high pass filter.

In step 90, it is tested if $\ddot{Z}li$ has exceeded a threshold value a1, and the times when $\ddot{Z}li$ has exceeded a1 is counted for each Nc cycles. Each count number is stored in the memory so that the count numbers in the latest certain cycles, e.g. eight cycles, are always maintained, by replacing the oldest count by a newest count each time when it is obtained, and the sum of the outstanding counts is calculated to provide a low frequency count number Nli. Similarly, it is tested if $\ddot{Z}hi$ has exceeded a threshold value a2, and the times when $\ddot{Z}hi$ has exceeded a2 is counted for each Nc cycles. Each count number is stored in the memory so that the count numbers in the latest certain cycles such as eight cycles, are always maintained, by replacing the oldest count by a newest count each time when it is obtained, and the sum of the outstanding counts is calculated to provide a high frequency count number Nhi.

In step 100, it is tested if a cycle count number N for counting the cycles has reached Nc, and if the answer is "yes", the control process proceeds to step 110, whereas if the answer is "no", the control process proceeds to step 210.

In step 110, the cycle count number N is reset to zero, and in step 120, the low frequency count number Nli and the high frequency count number Nhi are renewed by the newest data.

In step 130, a flag F is set to 1 to show that the cycle count has once attained Nc, and Nli and Nhi have once been renewed.

In step 140, it is tested if Nli (i=1, 2, 3 or 4) is equal to or greater than a predetermined positive threshold value Np, and if the answer is "yes", the control process proceeds to step 150, where it is tested if Nhi is equal to or greater than a predetermined positive threshold value Nq, and if the answer is "no", the control process proceeds to step 160, whereas if the answer is "yes", the control process proceeds to step 170.

On the other hand, if the answer in step 140 is "no", the control process proceeds to step 180, where it is tested if Nhi is equal to or greater than Nq, and if the answer is "yes", the control process proceeds to step 190, whereas if the answer is "no", the control process proceeds to step 200.

Thus, according to whether Nli is equal to or greater than Np or not and whether Nhi is equal to or greater than Nq or not, the road surface condition is discriminated into four cases a, b, c and d corresponding to steps 160, 190, 170 and 200.

Figure 10:
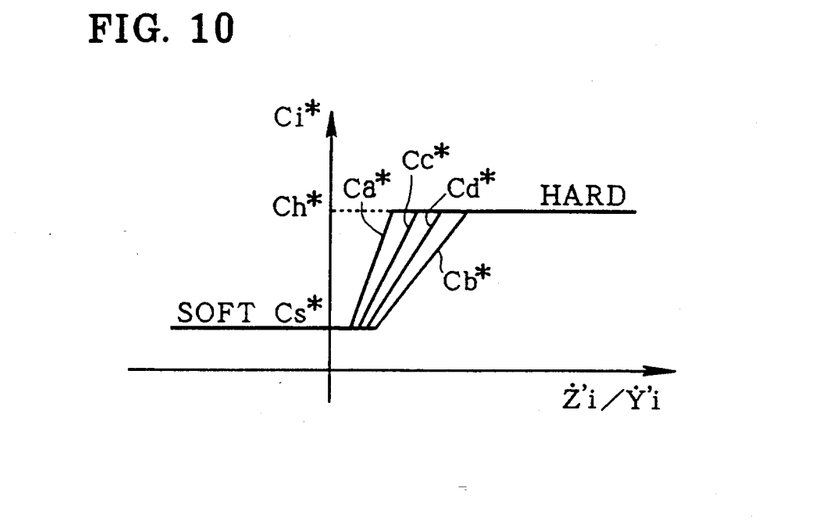
FIG. 10 is a graph showing an embodiment of the modification of the damp coefficient according to the present invention.

In step 160, i.e. when the vertical acceleration of the vehicle body or the vertical exciting force applied to the vehicle body is rich in low frequency components and not rich in high frequency components, the damping coefficient $C^*i$ of the corresponding shock absorber is adjusted to provide a performance shown by $Ca^*$ in FIG. 10, so that a relatively high damping coefficient $Ci = Ca^* \cdot \dot{Z}'i/\dot{Y}'i$ is applied to the corresponding shock absorber so as thereby to adapt the shock absorber to relatively long-pitched up and down irregularities of the road surface which would cause a low speed stroking of the shock absorber and therefore require a relatively high damping coefficient in order to effectively suppress the rolling, pitching, heaving and/or warping of the vehicle body.

In step 190, i.e. when the vertical acceleration of the vehicle body or the vertical exciting force applied to the vehicle body is rich in high frequency components and not rich in low frequency components, the damping coefficient $C^*i$ of the corresponding shock absorber is adjusted to provide a performance shown by $Cb^*$ in FIG. 10, so that a relatively low damping coefficient $Ci = Cb^* \cdot \dot{Z}'i/\dot{Y}'i$ is applied to the corresponding shock absorber so as thereby to adapt the shock absorber to relatively short-pitched up and down irregularities of the road surface which would cause a high speed stroking of the shock absorber and therefore require that the damp coefficient is relatively low, because otherwise the up and down vibrations of the vehicle wheel would be almost directly transmitted to the vehicle body.

In step 170, i.e. when the vertical acceleration of the vehicle body or the vertical exciting force applied to the vehicle body is rich in both high and low frequency components, the damping coefficient $C^*i$ of the corresponding shock absorber is adjusted to provide a such a medium performance as shown by $Cc^*$ in FIG. 10, so that a certain medium damping coefficient $Ci = Cc^* \cdot \dot{Z}'i/\dot{Y}'i$ is applied to the corresponding shock absorber in compromise with both low and high frequency vertical exciting forces.

In step 200, i.e. when the vertical acceleration of the vehicle body or the vertical exciting force applied to the vehicle body is not rich in both high and low frequency components, the control of the damping coefficient is less critical, but it will be desirable that the damping coefficient $C^*i$ of the corresponding shock absorber is also adjusted to provide such a medium performance as shown by $Cd^*$ in FIG. 10, so that a medium damang coefficient $Ci = Cd^* \cdot \dot{Z}'i/\dot{Y}'i$ is applied to the corresponding shock absorber so as thereby to adapt the shock absorber for both long and short-pitched up and down irregularities of the road surface.

Calculations such as $Ci = Cj^* \cdot \dot{Z}'i/\dot{Y}'i$ (j=a, b, c or d) are carried out in step 230, and control signals for the actuators 16$i$ are output in step 240.

In step 250, the suffix i is incremented by one, and in step 260, it is tested if i is equal to 5. If the answer is "no", i.e. if the one cycle control has not yet been effected for all of the shock absorbers of the four vehicle wheels, the control process proceeds to step 280, where it is tested if the flag F is 1, and if the answer is "yes" the control process is repeated from the step 140, using the same low and high frequency count numbers Nli and Nhi, until the answer in step 260 turns to "yes" after the one cycle control has been effected for all the four shock absorbers.

When the answer in step 260 has turned to "yes", the control process proceeds to step 270, and the suffix i is reset to 1, and the whole control procedure is repeated.

Until the cycle count number N first attains Nc, or in other words, until a predetermined time lapses from the start of the control upon the closing of the ignition switch, the control process proceeds from step 100 to step 210, and since the flag F still remains at the initialized zero, the control process proceeds to step 220, where a provisional initial setting for $C^*i$ is carried out, and then the control process proceeds to step 230. In this initial stage, the control process recycles through the steps 230, 240, 250, 260, 280 and back to 230, so as to control the four actuators 16i in succession based upon the provisionally set $C^*i$.

When the cycle count number N has first attained Nc, the control of $C^*i$ according to the steps 120 through 200 is started, and thereafter, during each period until the cycle count number N attains each count Nc, i.e. until each predetermined time lapses after $C^*i$ was once adjusted so as to discriminate the four cases a, b, c and d, the control process proceeds from step 100 to step 210, and then to step 230, and then goes through steps 230, 240, 250, 260 and 280, and then goes three times through steps 140–260 so that the control of the damping coefficient of the shock absorbers is carried out by using the same $C^*i$ (but according to changing $\dot{Z}'i/\dot{Y}'i$), until the cycle count number N again attains Nc, whereupon $C^*i$ is again renewed.

Although in the above embodiment the control of the damping coefficient $C^*i$ is changed according to discontinuous four cases and according to such performance characteristics as illustrated in FIG. 10, the damping coefficient may be changed according to more or less discontinuous cases or may be changed substantially continuously according to the frequency conditions of the vertical exciting force applied to the vehicle body.

Figure 11:
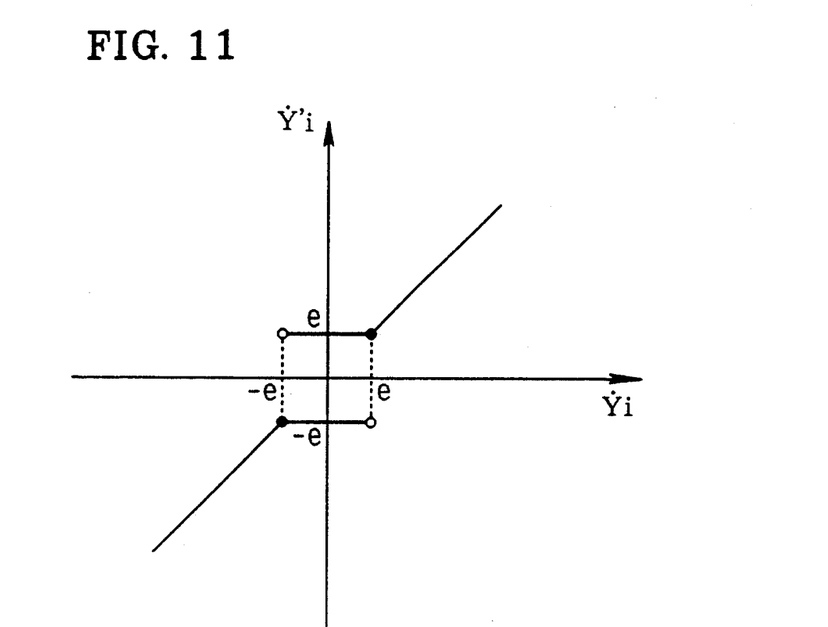
FIG. 11 is a graph showing the modification of the relative velocity of the mass body carried out by the processes shown in FIG. 7.

Referring to FIG. 7, the control operation carried out in step 50 of FIG. 3 for the modification of $\dot{Y}i$ will be described in more detail. The functions accomplished by the processes shown in the flowchart of FIG. 7 are illustrated in FIG. 11.

In step 51, it is tested if $\dot{Y}i$ is smaller than a predetermined relatively small positive value e, and if the answer is "yes", the control process proceeds to step 52.

In step 52, it is tested if $\dot{Y}i$ is larger than a predetermined relatively small negative value $-e$, and if the answer is "yes", the control process proceeds to step 53.

In step 53, it is tested if a flag Fyi is equal to 1, and if the answer is "no", the control process proceeds to step 54, where $\dot{Y}i$ is set to e, whereas if the answer in step 53 is "yes", the control process proceeds to step 55, where $\dot{Y}i$ is set to $-e$.

When the answer in step 51 is "no", the control process proceeds to step 56, where it is tested if the flag Fyi is equal to zero, and if the answer is "no", the control process proceeds to step 57, where the flag Fyi is set to zero.

When the answer in step 52 is "no", the control process proceeds to step 58, where it is tested if the flag Fyi is equal to 1, and if the answer is "no", the flag Fyi is set to 1.

After the step 54, 55, 58 or 59, or 56 or 57, the control process proceeds to step 60, where the suffix i is incremented by one, and then the control process proceeds to step 61, where it is tested if i is equal to 5. If the answer is "no", the control process returns to step 51, so as to repeat the above control processes until i attains 5, i.e. the control processes are effected for all of the four shock absorbers in the four wheel vehicle, and thereafter, in step 62 i is reset to 1, before terminating this subroutine.

As will be appreciated from the flowchart of FIG. 7, when $\dot{Y}i$ has got so small as to be between $+e$ and $-e$, including zero, $\dot{Y}i$ is modified to remain e or $-e$ according to its history whether it was larger than e or it was smaller than $-e$. According to this control, it is avoided that a division by zero occurs in step 70. Further, it is avoided that the value of $\dot{Y}'i$ fluctuates too often between $+e$ and $-e$ even when it makes small changes around zero.

Figure 12:
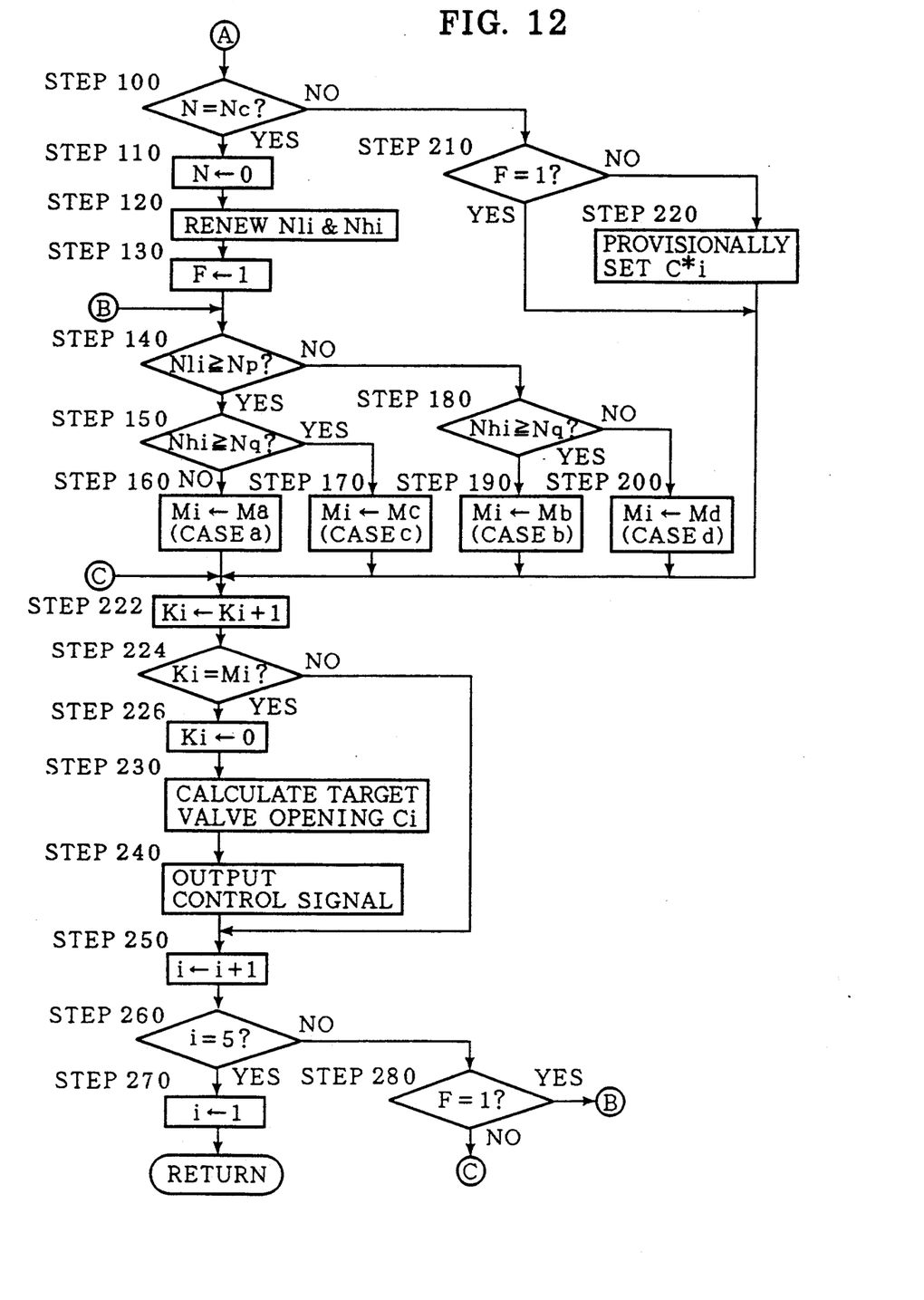
FIG. 12 shows a flowchart similar to the flowchart of FIG. 4, showing another embodiment of the present invention.

FIG. 12 is a flowchart similar to that of FIG. 4, showing another embodiment of the present invention. In the flowchart of FIG. 12, the control steps corresponding to those in the flowchart of FIG. 4 are designated by the same step numbers and are shown by the same notations as in FIG. 4. In this embodiment, in step 160 where the control reaches when the vertical acceleration of the vehicle body or the vertical exciting force applied to the vehicle body is rich in low frequency components and not rich in high frequency components, a frequency number Mi (i=1, 2, 3 or 4) which operates as described hereinbelow is set to a relativey small value Ma, while in step 190 where the control reaches when the vertical acceleration of the vehicle body or the vertical exciting force applied to the vehicle body is not rich in low frequency components and rich in high frequency components, a frequency number Mi is set to a relatively large value Mb. In step 170 where the control reaches when the vertical acceleration of the vehicle body or the vertical exciting force applied to the vehicle body is rich in both low and high frequency components, and in step 200 where the control reaches when the vertical acceleration of the vehicle body or the vertical exciting force applied to the vehicle body is not rich in both low and high frequency components, the frequency number Mi may be set to Mc and Md, respectively, both being generally larger than Ma but smaller than Mb.

After the frequency number Mi has been set to Ma, Mb, Mc or Md, in step 222 a cycle count number Ki, different from the cycle count number N, is incremented by one, and in step 224 it is tested if Ki has reached Mi. If the answer of the testing is "yes", the control process proceeds to step 226, where Ki is reset to zero, and the control process proceeds to step 230, whereas if the answer in step 224 is "no", the control process by-passes steps 226, 230 and 240 so as directly to reach step 250.

According to this embodiment, although the control process through steps 10 to 270 are repeated according to a predetermined cycle time with the periodical review with regard to whether the vertical acceleration of the vehicle body or the vertical exciting force applied to the vehicle body is rich or not rich in low frequency components and rich or not rich in high frequency components every time when Nc cycles of control operation have been carried out, the actual control adjustment of the actuators 16i to be carried out in steps 230 and 240 is selectively skipped by the incorporation of steps 222 and 224, so that the actual control adjustment of the actuators 16i is carried out only once during every Mi cycles of the repetitive control operations.

Therefore, when the road surface has long-pitched up and down irregularities so that the vertical acceleration of the vehicle body or the vertical exciting force applied to the vehicle body is rich in low frequency components and not rich in high frequency components, and therefore Mi is set to a relatively small Ma, the actual control adjustment of the actuators 16i for the shock absorbers is carried out at a relatively high frequency. Ma may be 1, and in that case, the actual control adjustment of the actuators 16i is carried out at every control cycle. Such a high frequency control adjustment of the actuators 16i is desirable when the vehicle is running on a road surface having relatively long-pitched up and down irregularities in order to effectively suppress the pitching and heaving oscillations of the vehicle body.

On the other hand, when the road surface has short-pitched up and down irregularities so that the vertical acceleration of the vehicle body or the vertical exciting force applied to the vehicle body is not rich in low frequency components and rich in high frequency components, it is desirable that the control adjustment of the actuators is not so frequent in order to avoid too often change of the damping coefficient of the shock absorber which will damage the riding comfortability of the vehicle. Therefore, in this case Mi is set to a relatively large Mb, so that the actual control adjustment of the actuators 16i for the shock absorbers is carried out at a low frequency, by skipping the steps 230 and 240 more times during the control cycles.

When the vertical acceleration of the vehicle body or the vertical exciting force applied to the vehicle body is rich in both high and low frequency components, the frequency of the control adjustment of the damping coefficient should desirably be adjusted to a medium frequency in compromise with both low and high frequency vertical exciting forces. Therefore, Mc may be of a magnitude between Ma and Mb.

When the vertical acceleration of the vehicle body or the vertical exciting force applied to the vehicle body is not rich in both high and low frequency components, the control of the damping coefficient is less critical. However, it would be advantageous to set Md for this case to be generally of the same value as Mb, so as to be ready for any abrupt encounter with up and down irregularities.

In the embodiment shown in FIG. 12, in steps 160, 170, 190 and 200, the same modification control of the magnitude of C*i as illustrated in FIG. 10 in the embodiment shown in FIG. 4 may also be carried out together with the setting of the frequency number Mi.

Although the invention has been described in detail in the above with respect to some preferred embodiments thereof, it will be apparent for those skilled in the art that various modifications and/or omissions are possible with respect to those embodiments within the scope of the present invention.

I claim:

1. A suspension control system for a suspension supporting a mass body on a support base via a parallel combination of a shock absorber having a variable damping coefficient and a spring means, comprising:
 a means for obtaining absolute velocity ($\dot{Z}$) of said mass body along a moving path of expansion and contraction of said shock absorber;
 a means for obtaining relative velocity ($\dot{Y}$) of said mass body in reference to said support base along said moving path;
 a means for obtaining acceleration ($\ddot{Z}$) of said mass body along said moving path; and
 a means for controlling a damping coefficient of said shock absorber according to a ratio ($\dot{Z}/\dot{Y}$) of said absolute velocity to said relative velocity with cyclic readjustment thereof so that at least either said damping coefficient is greater relative to said ratio when said acceleration is rich in low frequency components or a frequency of said cyclic readjustment is lower when said acceleration is rich in high frequency components.

2. A suspension control system according to claim 1, wherein said control means controls said damping coefficient to be even greater relative to said ratio when said acceleration is not rich in high frequency components.

3. A suspension control system according to claim 1, wherein said control means controls said damping coefficient to be between a damping coefficient for said acceleration being rich in low frequency components and not rich in high frequency components and a damping coefficient for said acceleration being not rich in low frequency components and rich in high frequency components when said acceleration is rich in both low and high frequency components.

4. A suspension control system according to claim 1, wherein said control means controls said damping coefficient to be between a damping coefficient for said acceleration being rich in low frequency components and not rich in high frequency components and a damping coefficient for said acceleration being not rich in low frequency components and rich in high frequency components when said acceleration is not rich in both low and high frequency components.

5. A suspension control system according to claim 1, wherein said control means controls said frequency of said cyclic readjustment of said damping coefficient to be even lower when said acceleration is not rich in low frequency components.

6. A suspension control system according to claim 1, wherein said control means controls said frequency of said cyclic readjustment of said damping coefficient to be between a frequency for said acceleration being rich in high frequency components and not rich in low frequency components and a frequency for said acceleration being not rich in high frequency components and rich in low frequency components when said acceleration is rich in both high and low frequency components.

7. A suspension control system according to claim 1, wherein said control means controls said frequency of said cyclic readjustment of said damping coefficient to be between a frequency for said acceleration being rich in high frequency components and not rich in low frequency components and a frequency for said acceleration being not rich in high frequency components and rich in low frequency components when said acceleration is not rich in both low and high frequency components.

8. A suspension control system according to claim 1, wherein said control means determines that said acceleration is rich in low frequency components when a signal bearing said acceleration is filtered through a low pass filter and a magnitude of said filtered signal is equal to or greater than a predetermined value at or more than a predetermined number of times of a predetermined number of successive cycle time points.

9. A suspension control system according to claim 1, wherein said control means determines that said acceleration is rich is high frequency components when a signal bearing said acceleration is filtered through a high pass filter and a magnitude of said filtered signal is equal to or greater than a predetermined value at or more than a predetermined number of times of a predetermined number of successive cycle time points.

* * * * *